(12) United States Patent
Yanosy (10) Patent No.: US 7,069,260 B2
(45) Date of Patent: Jun. 27, 2006

(54) QOS FRAMEWORK SYSTEM

(75) Inventor: John Anthony Yanosy, Grapevine, TX (US)

(73) Assignee: Motorola, Inc., Schaumburg, IL (US)

( * ) Notice: Subject to any disclaimer, the term of this patent is extended or adjusted under 35 U.S.C. 154(b) by 624 days.

(21) Appl. No.: 10/146,083

(22) Filed: May 15, 2002

(65) Prior Publication Data

US 2003/0217128 A1 Nov. 20, 2003

(51) Int. Cl.
*G06F 17/00* (2006.01)

(52) U.S. Cl. .............................. 706/47; 706/45; 706/50

(58) Field of Classification Search .................. 706/47, 706/45, 50
See application file for complete search history.

(56) References Cited

U.S. PATENT DOCUMENTS 6,356,885 B1 * 3/2002 Ross et al. ..................... 706/45
6,865,565 B1 * 3/2005 Rainsberger et al. .......... 706/47

OTHER PUBLICATIONS

Campagne et al, "A Framework to Specify a Reactive and Protective Management System", IEEE Symposium on Emerging Technologies and Factory Automation, Oct. 1995.*

A. Ginsberg, "View-Rules and Representations: A Framework for Dynamic Control of Multimedia in Virtual Environments", IEEE International Conference on Multimedia Computing and Systems, Jun. 1999.*

Wu et al, "Knowledge Object Modeling", IEEE Transactions on Systems, Man, and Cybernetics, Mar. 2000.*

* cited by examiner

Primary Examiner—George Davis
(74) Attorney, Agent, or Firm—Charles J. Bethards (57) ABSTRACT

A quality of service (QOS) framework for mediating needs of software applications in the context of an application framework with capabilities of a network host platform in response to a service request from the software application. The QOS framework includes a QOS knowledge base and rules module including a specialized set of system wide rules for dynamically changing QOS behavior in response to the service request. The QOS framework also includes QOS framework service modules for negotiating between the software application and the network host platform based on the specialized set of system wide rules included in the QOS knowledge base and rules module. In addition, the QOS framework includes a plurality of QOS application platform interfaces (APIs) for interconnecting the QOS framework service modules with the QOS knowledge base and rules module, and a plurality of APIs for connecting the application with the QOS framework service modules and with the network host platform.

16 Claims, 5 Drawing Sheets

QOS FRAMEWORK SYSTEM

BACKGROUND OF THE INVENTION

1. Field of the Invention

The present invention relates to software application development, and specifically to a quality of service (QOS) framework that enables software application behavior modification at an application platform interface (API) in response to requests across the API.

2. Description of Related Art

Open application platform interfaces (APIs) provide software applications with access to application framework services and also potentially to network communications services. However, the underlying infrastructure often needlessly wastes component resources in attempting to respond to an application service request when insufficient resources are available or when the service request parameters exceed service limits set by the system operator or service provider.

Quality of service (QOS) frameworks enable service providers to control the utilization of resources when the utilization of such resources might impact the perceived quality of service resulting from the request. However, conventional QOS frameworks are normally oriented to communication network level services, rather than to solving the problem of relating QOS needs of a software application with QOS capabilities of network resources, as such a scenario requires the software application to have inherent knowledge of the particular QOS parameters associated with a specific network service, and to interact with the network service with respect to QOS needs according to the definitions of the service.

Current communications networks typically utilize user to network protocols to request network services and potentially negotiate QOS capabilities for desired communication services and channels. Such QOS capabilities are normally inherent in network design and implementation. Therefore a service provider cannot modify the range of acceptable values. In addition, users must conform to the parameter definitions and value types of the respective protocols.

Similarly, in network node to network node protocols associated with QOS, little flexibility exists for changing the acceptable ranges of QOS values, thereby resulting in the need for strict conformance to the network protocols and parameter definitions. Current software API solutions normally do not have QOS aspects associated with a service offered by the API to applications, and, even if they did, strict adherence to the interface definition and the QOS parameter definitions would similarly be required.

Therefore, what is needed is a QOS framework that is capable of enabling behavior modification at an application framework API, preferably, in response to service requests across the API and that, preferably, will mediate QOS needs of a requesting application with the QOS capabilities of the providing service.

BRIEF DESCRIPTION OF THE DRAWINGS

Objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

Figure 1:
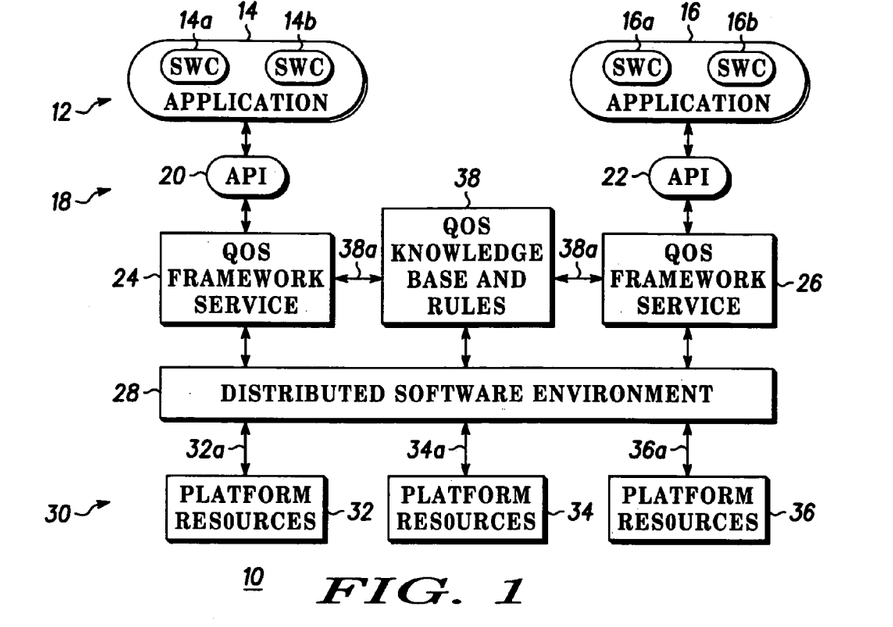
FIG. 1 is a block diagram of an exemplary software application framework including a QOS framework and access interfaces according to the present invention.

Referring now to the drawings in which like numerals reference like parts, FIG. 1 illustrates the various layers of a software application framework (application framework) 10 such as a distributed computer and communications network, a software environment that includes middleware such as a Parlay server, an application server with interfaces to other systems such as database systems, a speech recognition system or a network telecommunications system, or any system having QOS requirements with respect to application level use of services through an API or through a software component with a standard interface.

The layers of the application framework 10 include an application layer 12 having exemplary software applications (applications) 14, 16 each with respective software components 14*a*, 14*b* and 16*a*, 16*b*, a QOS framework, or middleware, layer (QOS middleware layer) 18 including APIs 20, 22 and exemplary QOS framework service modules 24, 26 as well as a QOS knowledge base and rules module 38, a distributed software environment layer 28 such as a J2EE, CORBA or DCOM environment, and a network host platform and resource layer 30 represented by exemplary platform resources 32, 34, 36 of, for example, a telecommunications service provider or operator, and their respective platform specific APIs, 32*a*, 34*a*, 36*a*. The APIs 20, 22 are implemented by the applications 14, 16 to enable service requests from the applications to be transmitted to the platform resources 32, 34, 36 via the QOS framework service modules 24, 26 and optionally the distributed environment 28.

As will be discussed below in detail, the QOS knowledge base and rules module 38 is accessible by the QOS framework service modules 24, 26 through QOS APIs 38*a*. The QOS knowledge base and rules module 38 includes a specialized set of system wide rules that is used to provide guidance on how to mediate the needs of the requesting applications 14, 16 with the capabilities of the platform resources 32, 34, 36 of the service provider, and can dynamically change QOS behavior at different places in the application framework 10 in response to services requests from the applications 14, 16 based on its specialized set of system wide rules.

While the application framework 10 is shown to include the distributed software environment 28, the distributed software environment 28 may or may not be included as a component in the application framework depending upon application requirements as long as the network host platform and resource layer 30, and therefore the platform resources 32, 34, 36, are accessible to the QOS middleware layer 18 through their own respective offered APIs, 32*a*, 34*a*, 36*a*.

Figure 2:
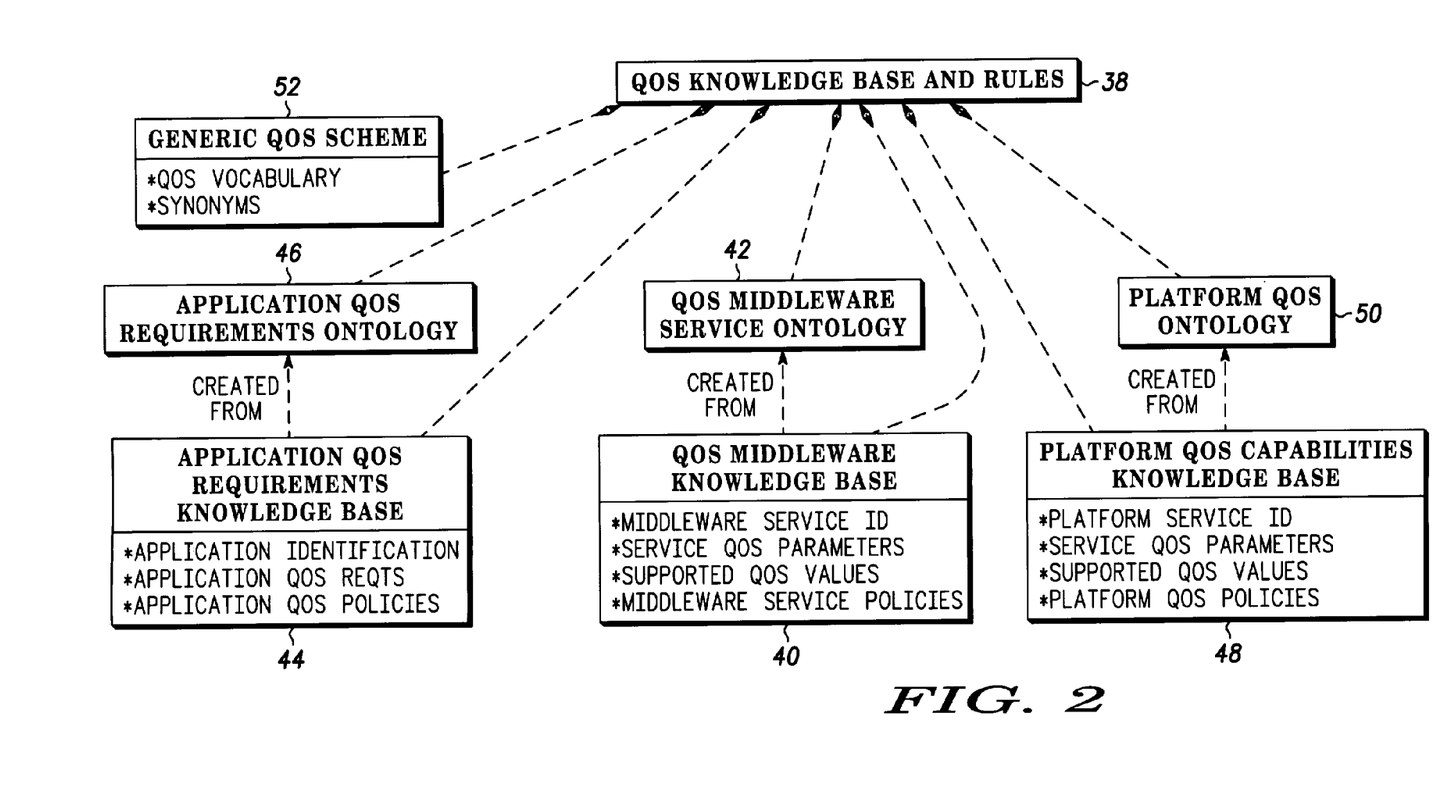
FIG. 2 is a block diagram showing the knowledge base and rules module of the QOS framework in more detail.

As shown in FIG. 2, the constituent elements of the QOS knowledge base and rules module 38 includes a QOS middleware knowledge base 40 defined by a QOS middleware service ontology 42 that provides a definitive specification for the QOS middleware knowledge base 40. The QOS knowledge base and rules module 38 is accessible through the QOS API 38a via a single knowledge query protocol that may be a protocol such as OKBC (Open Knowledge Base Connectivity), a W3C specification, or equivalent. The QOS middleware knowledge base 40 includes information attributes for middleware service IDs, service QOS parameters, supported QOS values and QOS middleware service policies that are all defined in detail by the QOS middleware service ontology 42, and that enable not only QOS service behavior control at the APIs 20, 22, but also an open API architecture to support the coordination of responses for the software components 14a, 14b and 16a, 16b in the respective applications 14, 16 conforming to the APIs 20, 22 when requesting services from the QOS framework services 24, 26. The middleware service policies are an additional element of QOS control that can be realized at different stages of the system life cycle, design time, compile time, system integration time, and/or run time to enable the QOS middleware layer 18 to control and represent QOS services and information in a form manner using representation meta structure languages such as RDF/XML and specific ontologies for representing QOS resource control services.

Still referring to FIG. 2, the QOS knowledge base and rules module 38 also includes three other knowledge bases and associated ontology models: an application QOS requirements knowledge base 44 defined by an application QOS requirements ontology 46, a platform QOS capabilities knowledge base 48 defined by a platform QOS ontology 50, and a generic QOS schema knowledge base with its own internal ontology specification 52. As with the QOS middleware knowledge base 40, the application QOS requirements knowledge base 44 and the platform QOS capabilities knowledge base 48 are instantiated with any commercial database technology that supports knowledge representation languages and knowledge interface (OKBC) type queries, while the generic QOS schema base 52 is also accessible by a similar OKBC interface.

Figure 4:
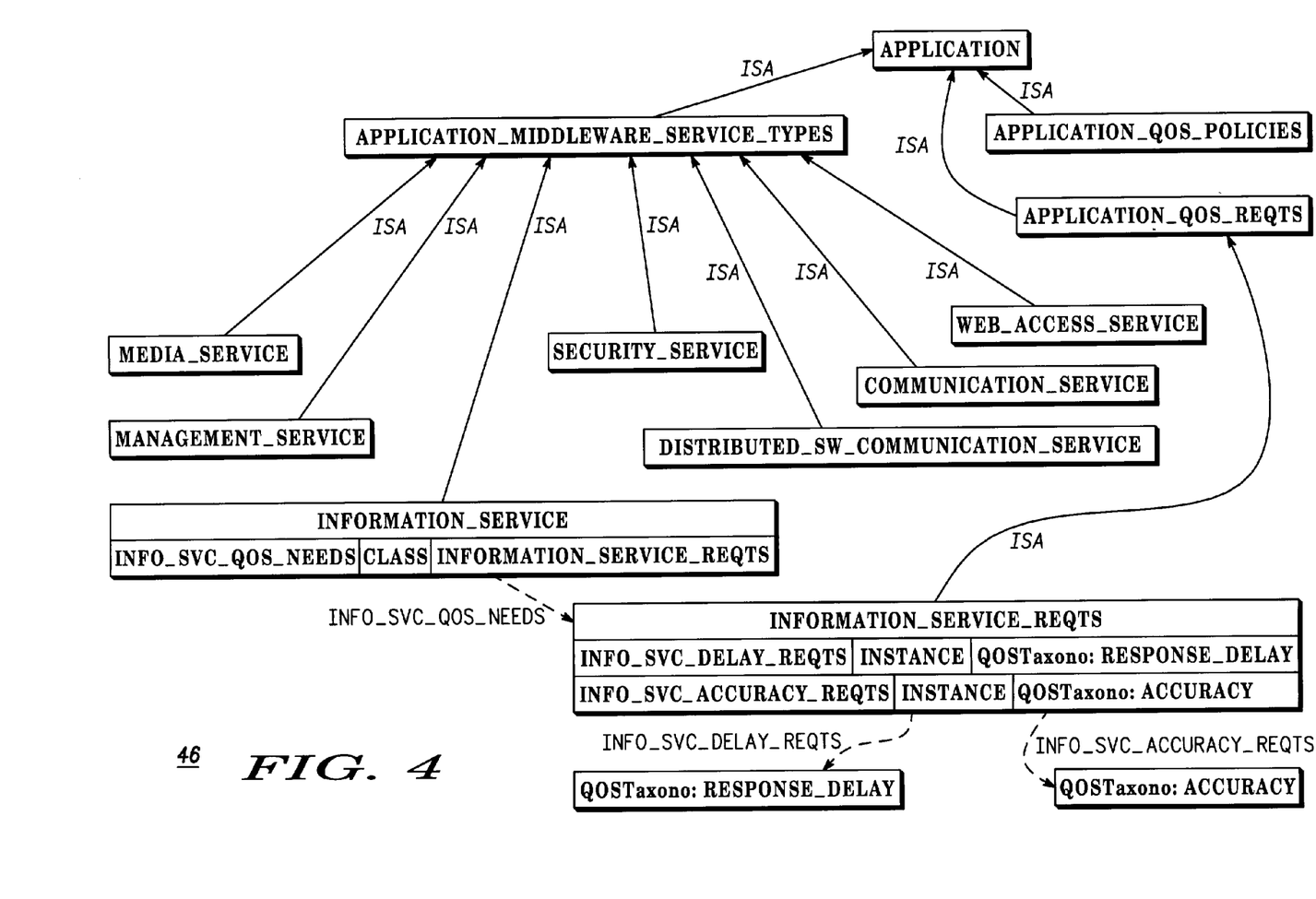
FIG. 4 is a top-level block diagram illustrating an application QOS requirements ontology included in the QOS framework of the present invention.

The application QOS requirements knowledge base 44 is connected to the QOS framework services 24, 26 through the QOS API 38a and the OKBC or equivalent interface protocol, and includes knowledge base information types such as application IDs, application QOS requirements and application QOS policies that are defined by the application QOS requirements ontology 46 (shown in more detail in FIG. 4). Similarly, the platform QOS capabilities knowledge base 48 is defined by platform QOS ontology 50 and is accessible by the QOS framework services 24, 26 through QOS API 38a and includes knowledge attributes such as platform service IDs, service QOS parameters, supported QOS values and platform QOS policies all defined by the platform QOS ontology 50.

Figure 5:
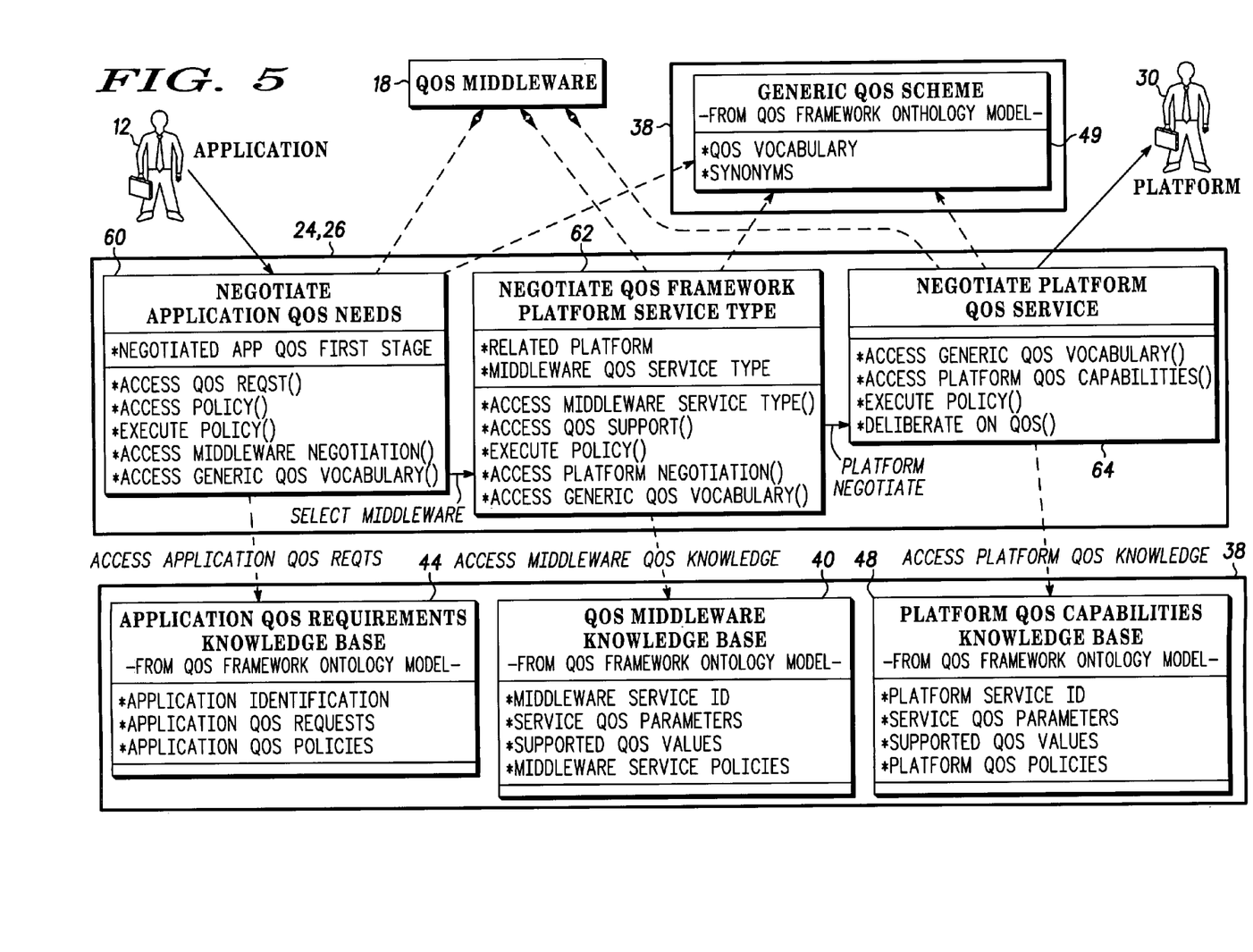
FIG. 5 is a block diagram showing a knowledge base and rules module and the QOS framework service modules of the QOS framework in more detail.

The generic QOS schema base 52 is accessible to the QOS framework services 24, 26 through the QOS API 38a and includes QOS vocabulary and synonyms for overall use by any of the detailed QOS framework functional elements, 60, 62, 64 shown in FIG. 5 and is used specifically to translate between vocabulary terms used by platform specific service APIs and the terms utilized generally by the QOS framework knowledge base and rules module 38 in its internal ontology models: QOS middleware service ontology 42; application QOS requirements ontology 46; and platform QOS ontology 50.

The QOS knowledge base and rules module 38 contains all of the information defining QOS terms, units, and other relational concepts defining rules or constraints regarding QOS values. Other rules contained in the QOS knowledge base and rules module 38 contain further constraints and policies defining appropriate actions that the QOS framework 18 should take in response to a service request to a platform where a matching QOS policy event is triggered.

Figure 3:
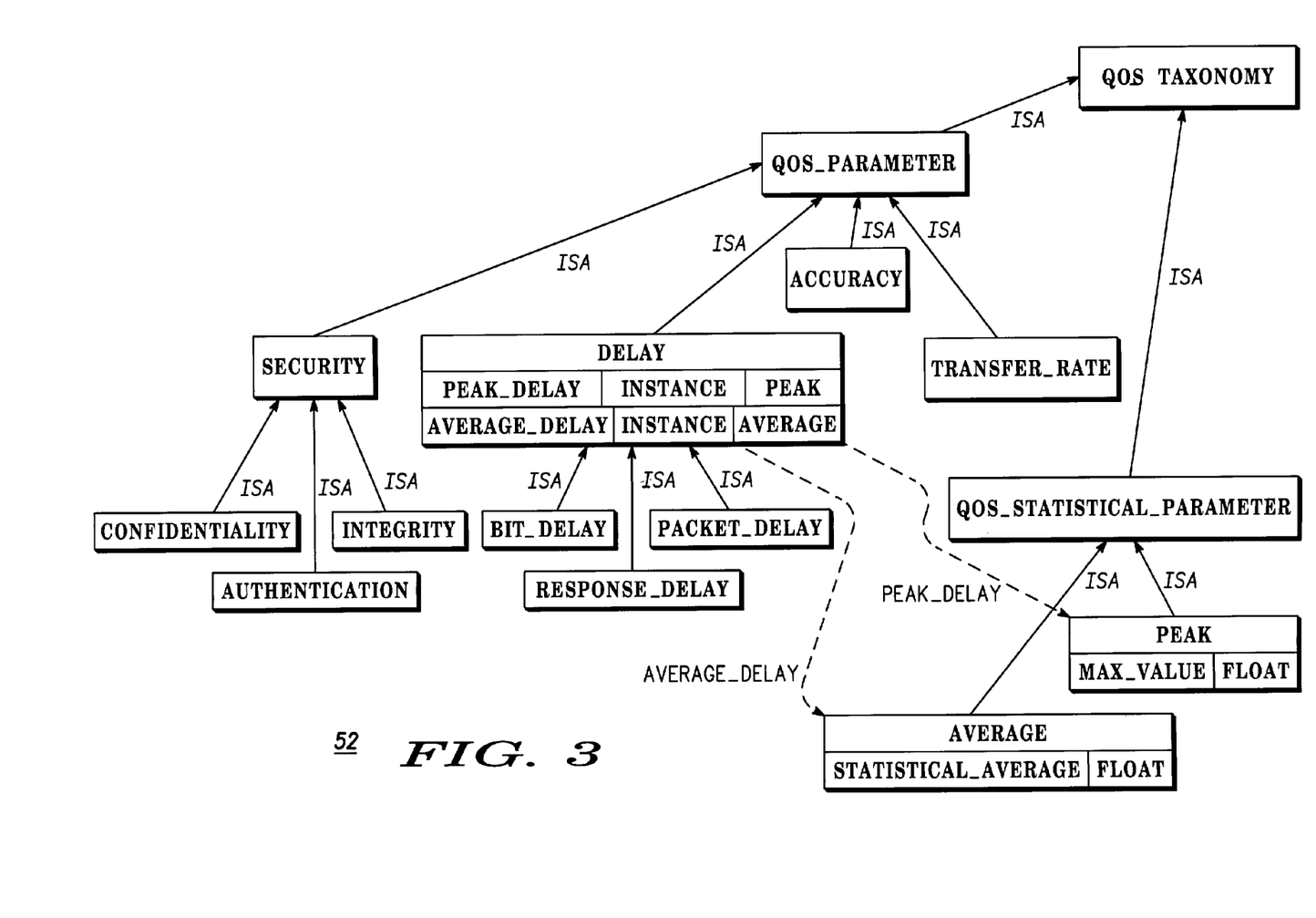
FIG. 3 is a top-level block diagram illustrating a generic QOS schema base included in the QOS framework of the present invention.

FIG. 3 illustrates a structural model of the generic QOS schema ontology 52 in a diagrammatic class structure format when using a tool that also enables computation interpretable formats such as RFDS programming format. Exemplary classes, properties of the classes and property value types are shown. Although the taxonomy is not complete, it is exemplary of the specific terms and model structure that are generally expected to be used in how an ontology is built in order to create the QOS middleware knowledge base 40. For example, as shown in FIG. 3, Delay is defined as a type of QOS parameter, with two attributes, Peak_Delay and Average_Delay, both of which are further defined by ontology classes Average and Peak. With this approach, further attributes can be defined, such as 95% Percentile Delay. These QOS parameters can be used directly in the QOS middleware knowledge base 40, since the QOS middleware service ontology 42 would have referenced these terms as part of its definition. Where the platform QOS ontology 50 is defined that uses different terms and definitions for Delay, the relationship between the ontologies can be established by the QOS framework ontologies by relating the platform specific term in the platform QOS ontology 50 to the term used in the generic QOS schema ontology 52.

Also in FIG. 3, other categories of QOS parameters such as Security, which are not normally thought of as QOS parameters, but in fact can impact the platform service quality, are added to the QOS framework knowledge bases. This ontology should have the highest level of QOS concepts relevant to many different platform types. Its purpose is to define QOS parameters and logical relationships among the ontologies without specifying any policies. Policies are specified or enabled by the application QOS requirements ontology 46, the QOS middleware service ontology 42, and the platform QOS ontology 50.

Similarly, FIG. 4 illustrates an exemplary structural model of the application QOS requirements ontology 46 that defines the structure and information contained in the application QOS requirements knowledge base 44. There will be one QOS application requirements knowledge base 44 for each application. The QOS application requirements knowledge base 44 provides information to the QOS middleware layer 18 to enable mediation between the applications 14, 16 and the platform resources 32, 34, 36 in the network host platform and resource layer 30. It should be noted that the application QOS requirements ontology 46 reuses many of the definitions of the generic QOS schema 52 in FIG. 3, as does the platform QOS ontology 50. For example, as discussed previously, the Delay QOS parameter in FIG. 3 is reused to define Info_Svc_Delay_Reqts as illustrated in FIG. 4. It should be noted that a specific relationship line exists between the attribute "Info_Svc_Delay_Reqts" of "Information_Service_Reqts" and "QOSTaxono:Response_Delay". In this way, generic definitions of QOS parameters and concepts can be refined and reused in more specific QOS parameter definitions in the QOS middleware service ontology 42, the application QOS requirements ontology 46 and the platform QOS ontology 50.

FIG. 5 illustrates the major functions of and relationships for the QOS middleware layer 18 and their dependencies on the QOS middleware knowledge base 40, application QOS requirements knowledge base 44, platform QOS capabilities knowledge base 48 and generic QOS schema base 52. As discussed above, the QOS middleware knowledge base 40, application QOS requirements knowledge base 44, platform QOS capabilities knowledge base 48 and generic QOS schema base 52 are programmed into the QOS knowledge base and rules module 38. As will now be discussed, a QOS middleware, or QOS framework, negotiator 62, an application QOS negotiator 60 and a platform QOS service negotiator 64 are programmed into each of the QOS framework service modules 24, 26. The QOS middleware negotiator 62, the application QOS negotiator 60 and the platform QOS service negotiator 64 communicate with the QOS middleware knowledge base 40, application QOS requirements knowledge base 44, platform QOS capabilities knowledge base 48 and generic QOS schema base 52 of the QOS knowledge base and rules module 38 across an OKBC or equivalent protocol for the purpose of querying these knowledge bases for specific information such as QOS event matches and associated policy conditions.

The application QOS negotiator 60 negotiates application QOS needs and therefore has the responsibility of providing the primary interface between any application and the QOS middleware layer 18 and for providing responses between the requesting application and the QOS middleware layer 18. Each application must comply with application middleware access functions and provide an appropriate application ID as per the application ID data stored in the application QOS requirements knowledge base 44 when requesting the services of the QOS middleware layer 18. The software applications 14, 16 will each access the specific application QOS requirements knowledge base 44 defined according to the application QOS requirements ontology 46, but with specific information for that application type concerning its QOS parameters, constraints and associated policies. In addition each of these application requirements functions will have API interfaces that offer specific proxy services to the platform resources 32–36 or to other application middleware services for the purpose of enabling QOS policy adaptations where none existed previously, with direct access to the network host platform and resource layer 30 or to the QOS application middleware layer 18. Yet, certain common QOS framework services are offered through each specific QOS framework middleware proxy component for each of the platform resources 32–36.

The QOS middleware negotiator 62 provides another mediation function between the application QOS negotiator 60 and the platform QOS service negotiator 64 by providing access to any other application middleware services and determining whether any QOS policy considerations should be applied to a service request. The QOS policies in this case are particular service type policies rather than particular platform type policies. Also, because the application QOS negotiator 60 will have already authorized application general access privileges, only policy adaptation for QOS for a general class of service, such as, for example, storage service or communications service, is provided.

The platform QOS service negotiator 64 has the responsibility of providing access to specific application middleware interfaces, or to specific platforms, offering services to applications, and also of determining whether any QOS policy considerations should be applied to a service request. The QOS policies in this case are applicable to each specific service request to the selected platform resource defined in its platform specific API. Any translations between generic QOS parameters and specific platform service QOS parameters are performed by the platform QOS service negotiator 64 by accessing the platform QOS capabilities knowledge base 48 and the generic QOS schema base 52 via the QOS API interface 38a available to all QOS framework functions defined here.

Figure 6:
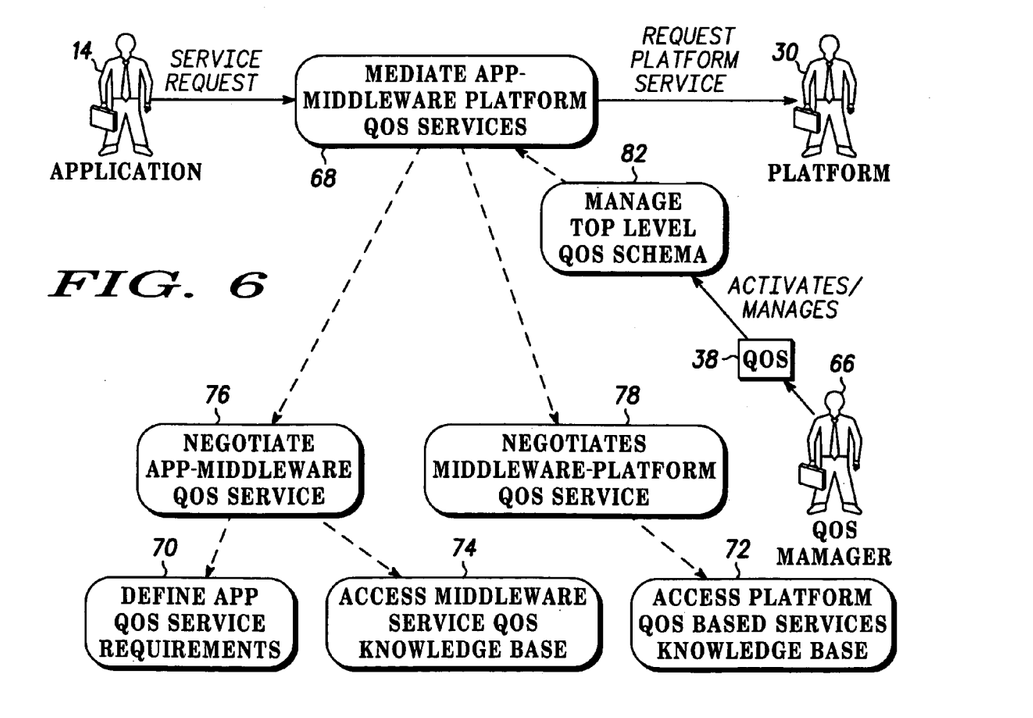
FIG. 6 is a use case diagram illustrating the operation of the QOS framework of the present invention.

FIG. 6 illustrates activities, represented as use cases, between the QOS application layer 18 and applications, such as the applications 14, 16 in FIG. 1, a QOS knowledge base and rules module manager 66, and network host platforms and resource layers capable of providing services requested by the applications 14, 16 such as the network host platform and resource layer 30 in FIG. 1. The following use case scenarios are applicable to all components of the application framework 10, as well as to any other application framework in which the QOS middleware layer 18 is implemented. Specifically, the QOS middleware layer 18 provides mediation services between the applications 14, 16 and the network host platform and resource layer 30, to the applications 14, 16 and other lower level middleware services, such as, for example, Parlay available to the applications 14, 16 through the Parlay APIs as represented by the mediate application-middleware-platform QOS services use case 68.

Specifically, the applications 14, 16 make service requests to the QOS middleware layer 18 instead of directly to the platform resources 32, 34, 36, as the QOS middleware layer 18 acts as a proxy for the network host platform and resource layer 30. The application QOS service requirements ontology 46 in FIG. 2 is programmed into the QOS middleware layer 18 and defines the QOS requirements for each application service request, as is represented by the application QOS service requirements definitions use case 70. Similarly, the platform QOS ontology 50 in FIG. 2 is programmed into the QOS middleware layer 18 and defines the QOS capabilities for each platform service offered to the applications 14, 16 by the network host platform and resource layer 30, as is represented by the access platform QOS services knowledge base use case 72. In addition, the QOS middleware service ontology 46 maps each QOS capability of the network host platform and resource layer 30 to each QOS service that is used by the applications 14, 16, as is represented by the access middleware service QOS knowledge base use case 74.

As discussed above, the QOS middleware negotiator 62, the application QOS negotiator 60 and the platform QOS service negotiator 64 (FIG. 5) respectively negotiate the service requests made by the applications 14, 16 to the service capabilities of the network host platform and resource layer 30 by separately negotiating application/middleware QOS service and middleware/platform resource QOS service, as indicated by the negotiate application-middleware QOS service and negotiate middleware-platform QOS service use cases 76, 78, respectively, and also perform any necessary QOS translations and policy behavior or constraint effects. In addition, the QOS knowledge base and rules module 38 is shown as an external policy knowledge base in the QOS middleware layer 18, as it can be used for establishing additional constraints on the responses by the QOS middleware layer 18 for mediating any QOS application requirements with the platform capabilities, as well as any other constraints established by the QOS manager 66, as is represented by the manage top level QOS schema use case 82. In the external QOS knowledge base and rules module 38, vocabulary synonyms associate QOS parameters of the applications 14, 16 with the QOS parameters of the network host platform and resource layer 30 or with the vocabulary in the generic QOS schema base 52 that is published for use by application developers with respect to domains of platform service types such as, for example, storage QOS parameters or message communication service QOS parameters.

Each of the above-discussed use cases will now be discussed in more detail. Regarding the mediate application-middleware-platform QOS services use case 68, the application 14 initially transmits a service request to the QOS middleware layer 18 for a specific type of service. The QOS middleware layer 18 functional element Negotiate Application Requirement Needs, shown in the application QOS negotiator 60 in FIG. 5, evaluates the service request and determines what, if any, QOS parameters need to be considered, determines whether any application QOS policies need to be considered as contained in application QOS requirements knowledge base 44, and then begins negotiation through with the QOS middleware negotiator 62 for application-middleware QOS service (see use case 76) by first determining if there are any specified policies as contained in QOS middleware knowledge base 40 established for the middleware QOS service that has been requested.

If the policy does not terminate the service request by rejecting it as a result of inability to provide desired levels of QOS service, the functional element in the QOS middleware layer 18 shown as Negotiate Platform Service in the platform QOS negotiator 64 determines if there are any QOS policies associated with this platform contained in the platform QOS capabilities knowledge base 48, and then requests service with a platform resource, such as the platform resource 32, through its associated platform API 32a, with QOS values consistent with the aforementioned policies. At this point there may or may not be a need for a vocabulary schema translation through the generic QOS schema base 52 between the QOS middleware layer 18 and the service request. If necessary, such a vocabulary schema translation enables the QOS middleware layer 18 to adapt its platform interface service request parameters to any platform interface definition.

The negotiate application middleware QOS service use case 76 defines the interaction between the applications 14, 16 and the QOS middleware layer 18 when the applications 14, 16 make a service request for a platform resource. Specifically, this use case defines in more detail the specific interactions between the QOS knowledge base and rules module 38 and other functions that can determine a first level QOS policy based response. Both the QOS middleware knowledge base 40, which defines generic services for platform resources with generic QOS parameters, and the application QOS requirements knowledge base 44, which defines QOS needs of the applications 14, 16 are utilized by the QOS middleware negotiator 60 for this negotiation (see FIG. 2).

With the define application QOS service requirements use case 70, a developer can populate the QOS needs for each service request that it will make to the QOS middleware layer 18. The information about the QOS needs of the applications 14, 16 are entered into the application QOS requirements knowledge base 44. The application QOS requirements ontology 46 defines the application QOS requirements knowledge base 44 and includes aspects defining QOS parameters and desirable values for each service request that it invokes. An application developer can then populate a generic form of an application QOS knowledge base consistent with the ontology for such application type needs. The define application QOS service requirements use case 70 is also used by the QOS middleware layer 18 to access the application QOS requirements knowledge base 44 during run time situations.

In the access middleware service QOS knowledge base use case 74, after the initial requests by the applications 14, 16 and the query of the application QOS requirements knowledge base 44, it is necessary to query the QOS middleware knowledge base 40 to determine any QOS capabilities associated with the service request. This query result will be passed back to the QOS middleware negotiator 60 for the negotiate application middleware QOS service use case 76.

At the negotiate application middleware QOS service use case 76, the original request from the application 14 has been processed and any constraints, interpretations or policies at this level have already been applied. It is now necessary to match the result modified service request and QOS parameters and values with the capabilities of, for example, the platform resource 32, so it is necessary to query the platform QOS capabilities knowledge base 48.

At the access platform QOS capabilities knowledge base use case 72, a query is made to the platform QOS capabilities knowledge base 48 to determine any current policy constraints on the particular service request for the platform resource 32. The response will be sent back to the QOS middleware negotiator 60 and the platform QOS service negotiator 64 for the negotiate middleware-platform QOS service use case 78, where adjustments will be made to the final request to the platform resource 32 based on this response.

While the above description is of the preferred embodiment of the present invention, it should be appreciated that the invention may be modified, altered, or varied without deviating from the scope and fair meaning of the following claims.

For example the interface between the QOS framework 18 and the knowledge bases may be defined by some protocol other than OKBC, and the knowledge bases may themselves be encoded in a format other than RDF. The actual software implementation of the QOS framework functional elements identified above as the application QOS negotiator 60, QOS middleware negotiator 62 and platform QOS negotiator 64, may be in any technology form such as FIPA Intelligent Agents, CORB components, JAVA beans, or the like.

What is claimed is:

1. A quality of service (QOS) framework for mediating needs of an application framework software application with capabilities of a network host platform in response to a service request from the software application, comprising:
   a QOS knowledge base and rules module including a specialized set of system wide rules for dynamically changing QOS behavior in response to the service request;
   QOS framework service modules for negotiating between the software application and the network host platform based on the specialized set of system wide rules included in the QOS knowledge base and rules module; and
   a plurality of application platform interfaces (APIs) for connecting the application with the QOS framework service modules and the QOS framework service modules with the network host platform.

2. The QOS framework of claim 1, wherein the QOS knowledge base and rules module comprises a QOS middleware knowledge base that includes a QOS middleware service ontology and that is accessible by the QOS framework service modules through a standardized knowledge base query API.

3. The QOS framework of claim 2, wherein the QOS middleware knowledge base includes at least one of middleware service IDs, service QOS parameters, supported QOS values and QOS middleware service policies that are created by the QOS middleware service ontology and that enables QOS service behavior control at the plurality of APIs.

4. The QOS framework of claim 2, wherein the QOS knowledge base and rules module further comprises:
   an application QOS requirements knowledge base that includes an application QOS requirements ontology and that is accessible by the QOS framework service modules through the standardized knowledge base query API; and
   a platform QOS capabilities knowledge base that includes a platform QOS ontology and that is accessible by the QOS framework service modules through the standardized knowledge base query API.

5. The QOS framework of claim 4, wherein:
   the application QOS requirements knowledge base includes at least one of an application IDs, an application QOS requirements and an application QOS policies that are created by the application QOS requirements ontology and that enable the QOS service behavior control at the plurality of APIs; and
   the platform QOS capabilities knowledge base includes at least one of platform service IDs, service QOS parameters, supported QOS values and platform QOS policies created by the platform QOS ontology and that enable the QOS service behavior control at the plurality of APIs.

6. The QOS framework of claim 4, wherein the QOS knowledge base and rules module further comprises a generic QOS schema base connected to the QOS framework service modules through the standardized knowledge base query API and including QOS vocabulary and synonyms for QOS parameters of the QOS framework service modules for relating like QOS parameters of the QOS framework service modules to one another.

7. The QOS framework of claim 4, further comprising a QOS manager for managing top-level QOS schema so that the QOS middleware knowledge base, the application QOS requirements knowledge base and the platform QOS capabilities knowledge base are each associated with a specific use.

8. The QOS framework of claim 1, wherein the QOS knowledge base and rules module is externally accessible.

9. The QOS framework of claim 1, wherein the QOS framework service modules each comprise:
   an application QOS negotiator for interfacing with the software application and for negotiating QOS needs of the software application;
   a QOS middleware negotiator for providing the software application with access to QOS framework services and for determining whether any QOS policy considerations should be applied to the service request; and
   a platform QOS negotiator for providing access to specific QOS framework interfaces, for offering services to the software application, and for determining whether any QOS policy considerations should be applied to the service request.

10. A method of mediating needs of an application framework software application with capabilities of a network host platform in response to a service request from the software application, comprising:
    providing a specialized set of system wide middleware rules for dynamically changing a quality of service QOS behavior in response to the service request;
    connecting the software application with the network host platform through a plurality of application platform interfaces (APIs); and
    negotiating between the software application and the network host platform based on the providing of a specialized set of system wide middleware rules for dynamically changing QOS behavior in response to the service request.

11. The method of claim 10, wherein the providing of a specialized set of system wide middleware rules for dynamically changing QOS behavior in response to the service request comprises providing a QOS middleware knowledge base with a QOS middleware service ontology for defining the specialized set of system wide rules for dynamically changing QOS behavior in response to the service request.

12. The method of claim 11, wherein the providing of a specialized set of system wide middleware rules for dynamically changing QOS behavior in response to the service request further comprises:
    providing an application QOS requirements knowledge base that includes an application QOS requirements ontology; and
    providing a platform QOS capabilities knowledge base that includes a platform QOS ontology.

13. The method of claim 12, wherein the providing of a specialized set of system wide middleware rules for dynamically changing QOS behavior in response to the service request further comprises providing a generic QOS schema base including QOS vocabulary and synonyms for QOS parameters of the QOS middleware knowledge base, the application QOS requirements knowledge base and the platform QOS capabilities knowledge base for relating like QOS parameters of the QOS middleware knowledge base, the application QOS requirements knowledge base and the platform QOS capabilities knowledge base to one another.

14. The method of claim 13, further comprising managing top-level QOS schema so that the QOS middleware knowledge base, the application QOS requirements knowledge base and the platform QOS capabilities knowledge base are each associated with a specific use.

15. The method of claim 10, further comprising accessing the specialized set of system wide middleware rules for dynamically changing QOS behavior in response to the service request from outside the application framework to modify the specialized set of middleware rules and therefore modify the QOS behavior.

16. The method of claim 10, wherein the negotiating between the software application and the network host platform based on the providing of a specialized set of system wide middleware rules for dynamically changing QOS behavior in response to the service request comprises:
    interfacing with and negotiating QOS needs of the software application;
    providing the software application with access to QOS framework services and determining whether any QOS policy considerations should be applied to the service request; and
    providing access to specific QOS framework interfaces, offering services to the software application, and determining whether any QOS policy considerations should be applied to the service request.

* * * * *